United States Patent [19]

James

[11] 4,262,679
[45] Apr. 21, 1981

[54] CLOSING MECHANISM FOR A HARVESTER SAFETY DOOR

[75] Inventor: Mark C. James, Independence, Mo.

[73] Assignee: Allis-Chalmers Corporation, Milwaukee, Wis.

[21] Appl. No.: 134,746

[22] Filed: Mar. 27, 1980

[51] Int. Cl.³ ............................................. A01F 12/16
[52] U.S. Cl. .................................................. 130/27 JT
[58] Field of Search .......................... 130/27 JT, 27 R; 56/14.6

[56] References Cited

U.S. PATENT DOCUMENTS 4,195,644  4/1980  Ryczek .............................. 130/27 JT Primary Examiner—Jay N. Eskovitz

[57] ABSTRACT

A pivoted safety door for a harvester is disposed ahead of the concave and has a separately pivoted lip which normally rests on a front edge of the concave. An adjustably biased detent mechanism releases the lip, permitting it to pivot out of engagement with the concave, when a rock or the like of substantial size attempts to enter the threshing chamber and is engaged by the threshing rotor. A first manual control is provided for pivoting the main body of the door from its tripped position to a closed position. A second manual control is provided for pivoting the lip relative to the door to restore it to its detented position, this last mentioned function being effected after the main body of the door has been restored to a closed position. The detent mechanism for the lip includes a pair of adjustably loaded spring biased plungers which act on opposite sides of a detented part. The laterally opposite ends of the safety door are sealed in relation to vertical walls of the harvester by a pair of special seal structures which are pivoted to the harvester coaxially with the main body of the safety door. The seal structures each include a rigid longitudinal sealing member in overlapping relation to one end of main body of the safety door with a free end loosely connecting with the leading edge of the concave and includes a flexible sealing element in engagement with the adjacent vertical wall. The rear ends of the seal structures and safety door rest on and move up and down with the front of the concave when the latter is adjusted to change the clearance between the concave and the threshing rotor. The seal structures also serve as stops to limit upward swinging movement of the safety door at the time it is closed to its operating position.

2 Claims, 6 Drawing Figures

CLOSING MECHANISM FOR A HARVESTER SAFETY DOOR

TECHNICAL FIELD

This invention relates to a harvester or combine of the type having a threshing rotor and a cooperating concave for effecting threshing of agricultural crops. More particularly, the invention relates to a safety door for preventing rocks or the like from entering into the space between the threshing rotor and the cooperating concave.

BACKGROUND OF THE INVENTION

The threshing mechanism of a harvester typically includes a threshing rotor and an underlying concave which cooperate to thresh the grain or seeds from the crop passing between the rotor and the concave. The crop is delivered to the threshing mechanism by a feeder receiving the cut crop from the header located forwardly of the harvester. Occasionally, when the combine or the harvester is operating in rocky regions, the header will pick up a rock along with the crop, and unless the rock is removed before it enters between the threshing rotor and the cooperating concave, extensive damage may be caused to the threshing mechanism.

It is well known to provide a safety door or rock trap to intercept rocks or the like before they pass to the space between the threshing rotor and the concave. One such safety door is shown in U.S. Pat. No. 4,195,644. In the before mentioned patent there is illustrated a safety door which is hinged at its forward end and includes a pivotable detented lip, the rear edge of which rests on a forward edge of the concave. The present invention is directed to substantially improve the function and operation of a safety door of the type shown in the before-mentioned U.S. Pat. No. 4,195,644.

BRIEF DESCRIPTION OF THE INVENTION

The invention, which is particularly useful in a harvester having a threshing chamber with a crop inlet, a rotatable threshing rotor within the threshing chamber and a concave beneath the rotor may be characterized by a safety door constituting a portion of a floor of the inlet to the threshing chamber forward of the concave including a main body portion pivotally connected at its front end to the harvester on a first horizontal axis generally parallel to the axis of said threshing rotor together with a lip portion pivotally connected to the rear of the main body portion for pivotal movement about a second horizontal axis generally parallel to the first horizontal axis between a detented operating position in which an edge of the lip portion is in overlapping engagement with the front end of the concave and a tripped position in which the lip portion is disengaged from said concave.

The invention is further characterized by a detent mechanism carried by the safety door for normally maintaining the lip portion rigid with respect to said main body portion and a pair of manually operated controls for the lip and main body portions of the safety door. The manually operated control for the lip portion is operable to pivot the lip portion from its tripped position to its detented operating position and includes a transversely extending part the end of which presents a wrench receiving head.

The manually operated control for the main body portion includes a wrench receiving part nonrotatably secured to the main body portion in coaxial relation to the first horizontal axis.

The transversely extending part of the manually operated control for the lip portion may be spaced downwardly from the second horizontal axis so as to avoid interference with other structural parts of the combine.

BRIEF DESCRIPTION OF THE DRAWINGS

One embodiment of the invention is illustrated in the drawings in which.

DETAILED DESCRIPTION OF THE DRAWINGS

Figure 1:
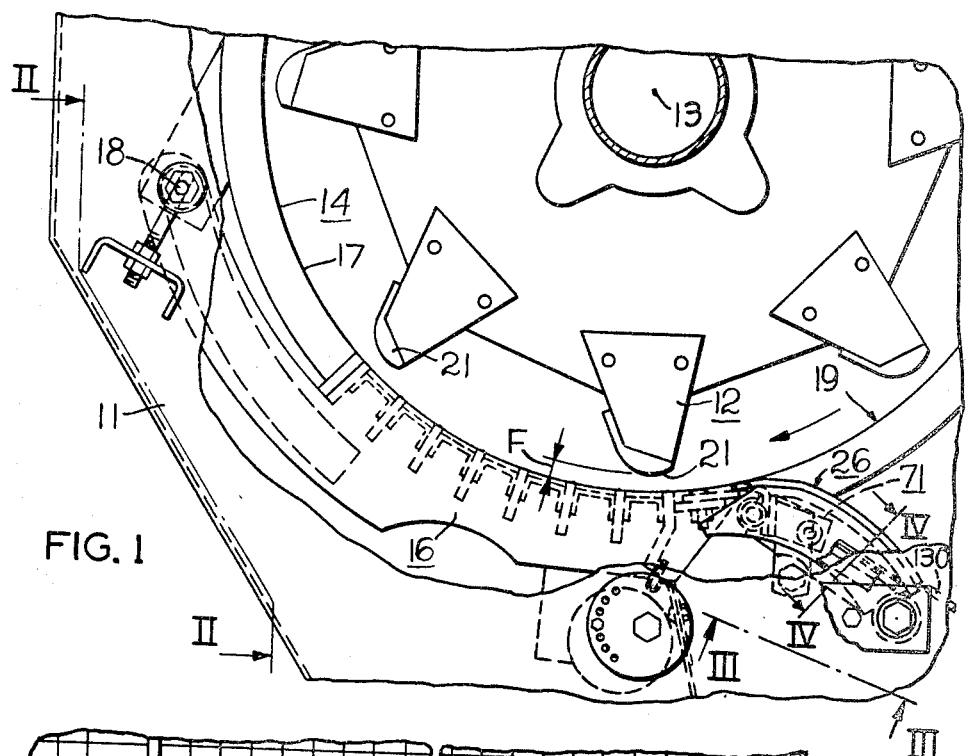
FIG. 1 is a partial side view of a combine harvester with portions broken away for illustration purposes.
Figure 2:
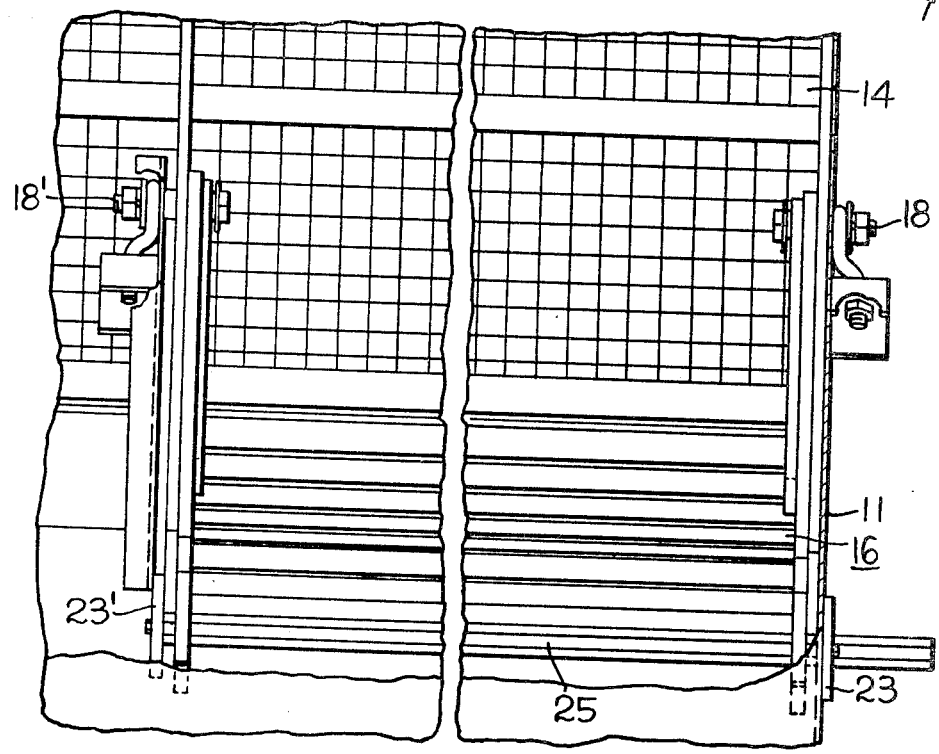
FIG. 2 is a view taken along the line II—II in FIG. 1.

Referring to FIGS. 1 and 2 the combine 11 includes the threshing rotor 12 rotatably mounted on a transverse horizontal axis 13 within a surrounding threshing chamber in the form of a foraminous cage 14 which includes a concave 16 at its bottom in underlying relation to the threshing rotor 12. The rear end of the concave 16 is supported on the main part 17 of the cage 14 by adjustable pivots 18, 18'. The threshing clearance F between rasp bars 21 at the outer periphery of rotor 12 and the concave 16 can be adjusted by interconnected eccentric mechanisms 23, 23', which upon being rotated effect vertical adjustment of the concave 16.

Figure 3A:
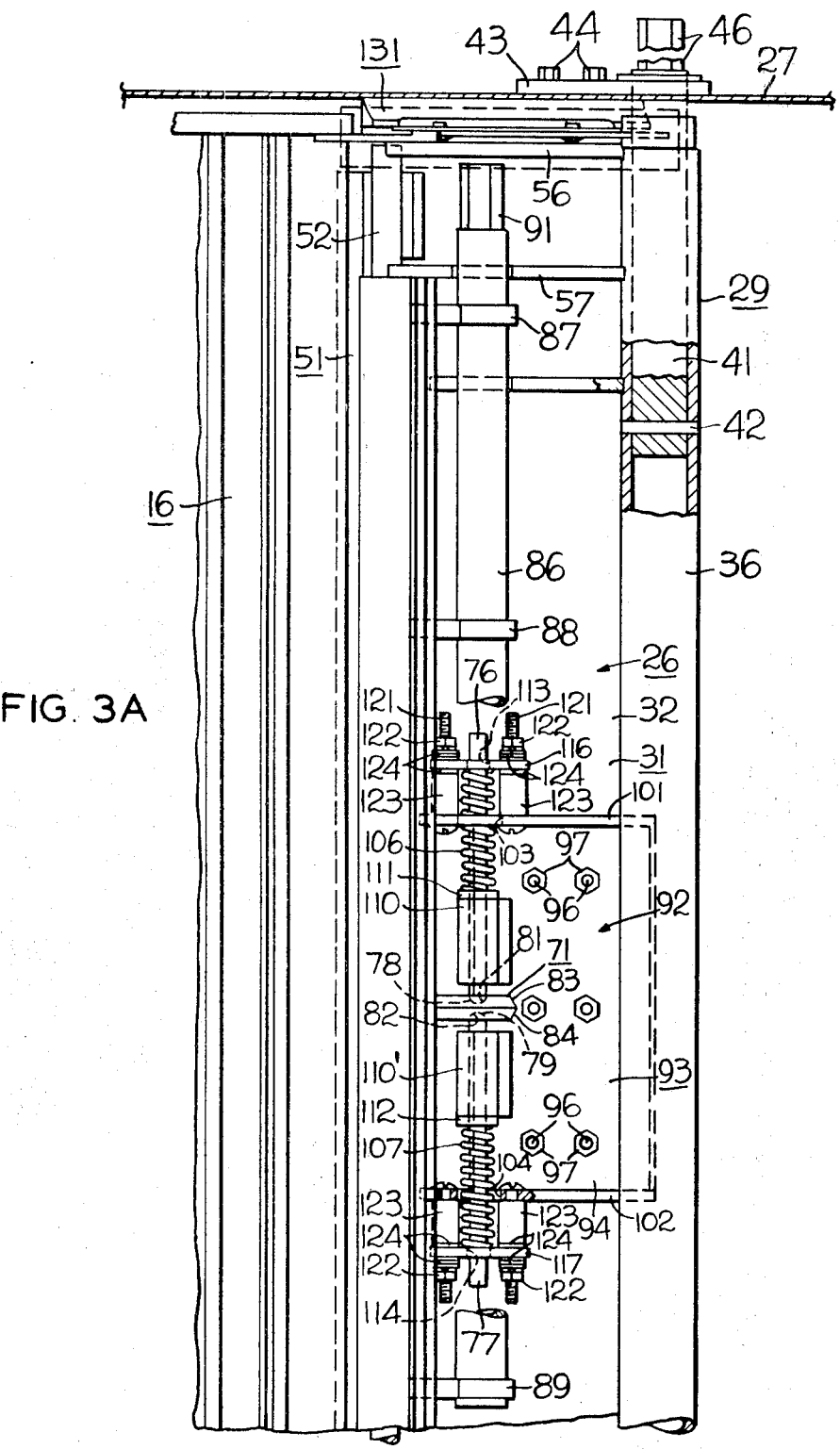
FIGS. 3A and 3B are views taken along the line III—III in FIG. 1.
Figure 3B:
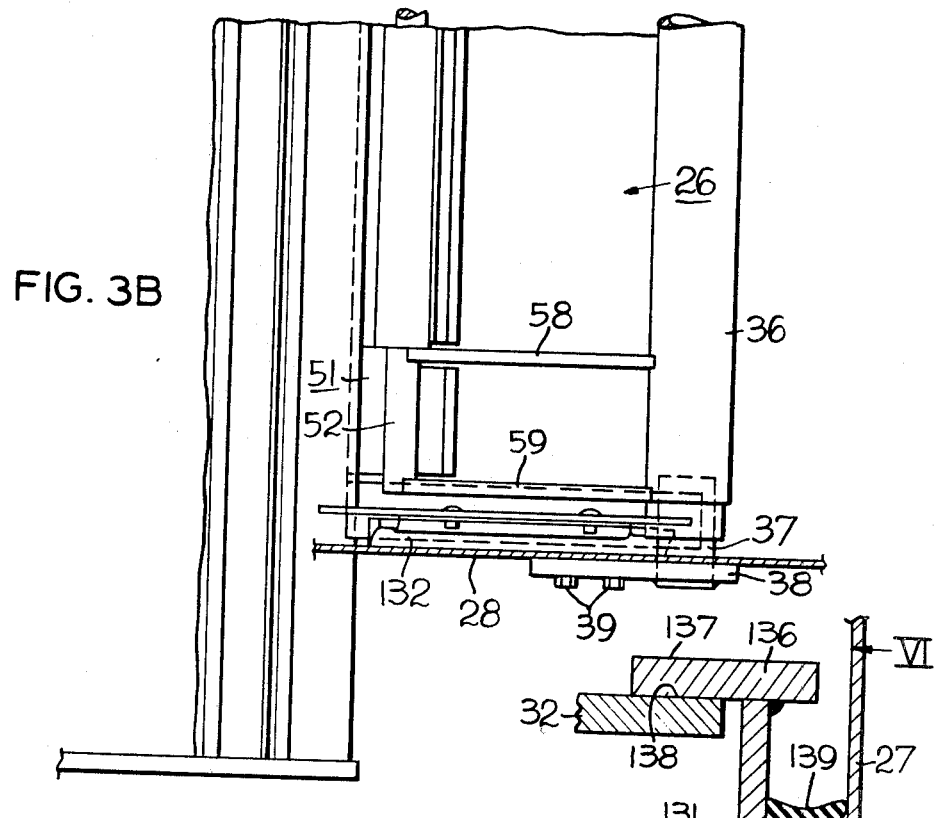
Figure 4:
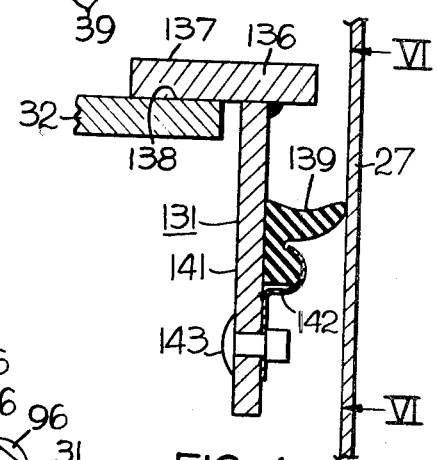
FIG. 4 is a view taken along the line IV—IV in FIG. 1.
Figure 5:
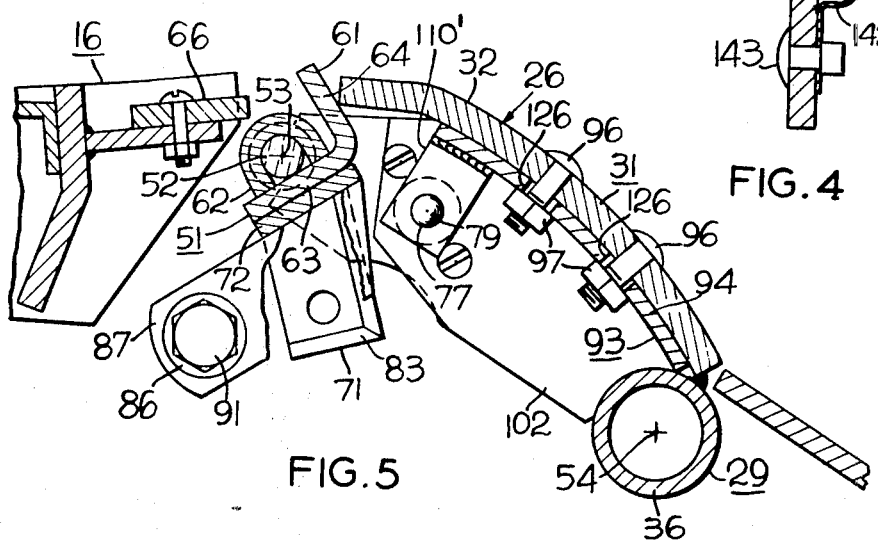
FIG. 5 is a longitudinal vertical section through the safety door showing the lip portion in a tripped position.

Referring also to FIGS. 3A and 3B, a safety door 26 embodying the present invention is disposed in front of the concave 16 at the point of entrance of the crop material through a crop inlet 19 in the cage 14. The safety door 26 is pivotally mounted on a pair of vertical sidewalls 27, 28 of the inlet 19 by a shaft 29. Referring also to FIGS. 4 and 5 the safety door 26 constitutes a portion of the floor in the inlet 19 to the threshing chamber or cage 14. The door 26 includes a main body portion 31 having a curved top plate 32 secured as by welding to a hollow cylindrical part 36 of the shaft 29. One end of the hollow cylindrical part 36 is in cooperative pivotal engagement with a stationary cylindrical bearing pin 37 welded to a plate 38 which in turn is rigidly secured to the wall 28 by cap screws 39. At the other end of the door 26, cylindrical rod part 41 is nonrotatably secured to the cylindrical shaft part 36 by a pin 42 and is pivotally mounted in a bearing bracket 43 secured to the sidewall 27 by cap screws 44. The outboard end of the rod part 41 is hex shaped to constitute a wrench receiving head 46.

The safety door 26 includes a lip portion 51 pivotally connected to a stationary shaft part 52 on the rear end of the main body portion 31 on a transverse, horizontal pivot axis 53 which is parallel to the pivot axis 54 of shaft 29 and to the axis 13 of rotor 12. The shaft part 52 is secured by welding to vertically extending, fore and aft reinforcing ribs 56, 57, 58, 59 welded to the underside of the plate 32 of the main body portion 31. The lip portion 51 includes an angle shaped part 61 and a U-shaped channel part 62, whose flange ends are welded to a flange 63 of the angle shaped part 61, in surrounding pivotable relation to the shaft part 52. The flange 64 of the angle shaped part 61 constitutes a lip which normally extends rearwardly in overlapping engagement with the top front edge 66 of the concave. The lip portion 51 includes a camming part in the form of a knife like detented element 71 secured by welding to a reinforcing plate 72 complementary to and welded to the flange 63 of angle shaped part 61. In the detented operating position of the lip portion 51 shown in FIGS. 1, 2 and 3, and detented element 71 is releasably engaged by opposed plungers 76, 77 whose inboard ends present convex camming surfaces 78, 79 in engagement with concave camming surfaces 81, 82 on transversely opposite sides of the detented element 71. The knife edges 83, 84 on the detented element 71 serve also as camming surfaces during relatching of the lip portion 51 in its detented operating position. The lip portion 51 also includes a manually operated mechanism by which it may be relatched which includes a transverse rod 86 extending through aligned openings in vertical brackets 87, 88, 89 to which it is welded. The brackets 87, 88, 89 are in turn welded to the transverse plate 72. The outboard end of the rod 86 is hex shaped to form a wrench receiving head 91.

The detent mechanism also includes plunger assembly 92 having a mounting bracket 93 with a horizontal part 94 releasably secured to the plate 32 of the main body portion 31 by releasable fastening means in the form of screws 96 and nuts 97. The mounting bracket 93 includes a pair of parallel, transversely spaced, downwardly extending walls 101, 102 which extend in a fore and aft direction and present aligned openings 103, 104 through which the plungers 76, 77 and their biasing springs 106, 107 freely extend. The plungers 76, 77 are reciprocably mounted in guide blocks 110, 110' welded to the horizontal part 94 of the bracket 93 and have washers 111, 112 welded thereto to provide shoulders on the plungers in axial thrust transmitting engagement with coil springs 106, 107. The outboard ends of the plungers 76, 77 pass through openings 113, 114 in backup plates 116, 117 which are adjustable secured to the walls 101, 102 of the bracket 93 by releasable fastening means in the form of screws 121 and nuts 122. The screws 121 extend through bushings 123 and washers 124 and by adding or substracting washers between the bushings 123 and the backup plates 116, 117 the bias or thrust of the springs against the plungers 76, 77 can be increased or decreased.

By making the plunger assembly 72 in the form of a replaceable unit, it can be replaced as a unit in event of field failure, and it can be manufactured as a separate assembly thereby permitting better control of tolerances. Also it will be noted that the holes 126 in the bracket through which the screws 96 extend are considerably larger in diameter than the diameter of the screws 96, thereby permitting the horizontal position of the bracket 93 to be shifted to accurately position the plungers 76, 77 relative to the detent element 71 on the lip portion 51.

Figure 6:
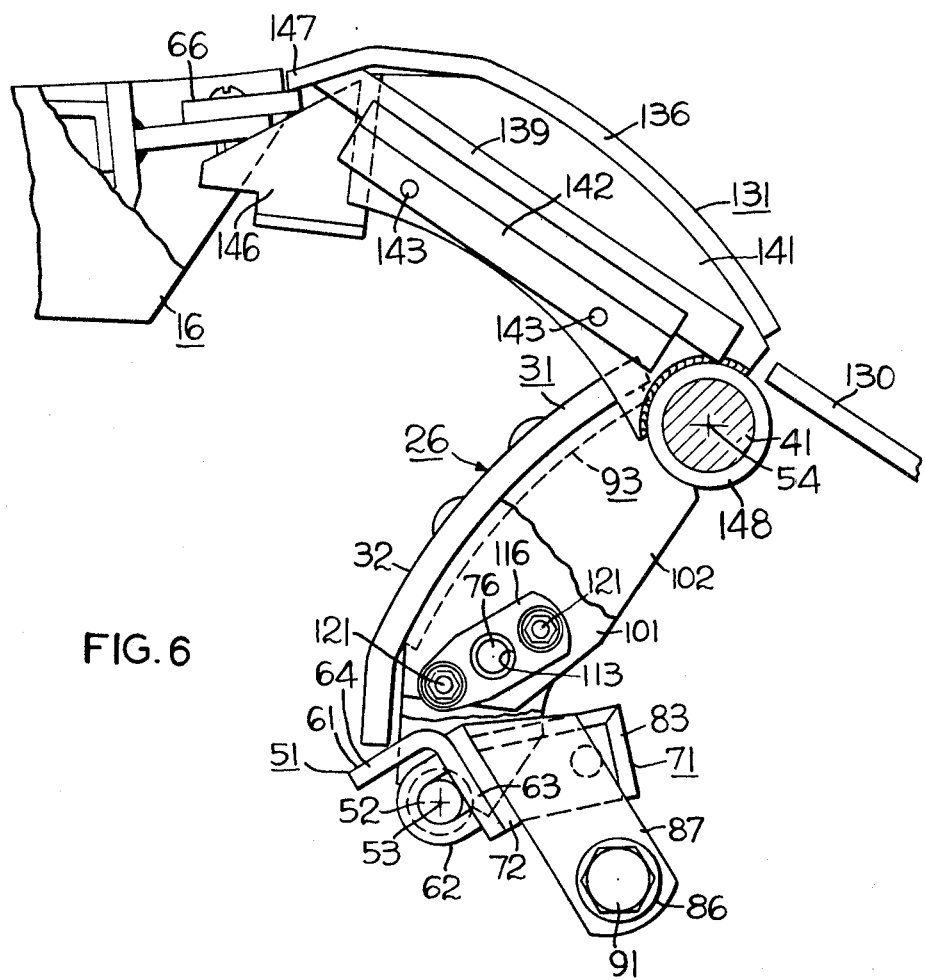
FIG. 6 is a view taken along the line VI—VI in FIG. 4 showing both the lip portion and safety door and tripped and rock discharging positions.

When a rock is conveyed via feeder floor 130 onto the door 26 and is engaged by a rasp bar 21, the force exerted against the body portion 31 of the door will be sufficient to trip the lip portion 51. That is, the detented element 71 will swing downwardly out of detented engagement with the inboard ends of the plungers 76, 77 as the flange or lip 64 of the lip portion 51 swings upwardly and forwardly out of engagement with the front end of the concave 16. The fully tripped condition of the lip portion 51 is shown in FIGS. 5 and 6. FIG. 6 not only shows the lip portion 51 in its tripped position, but also shows the main body portion 31 of the safety door 26 in its tripped position in which the rock which caused the door to open would be discharged from the threshing area of the harvester or combine.

In using the safety door mechanism of U.S. Pat. No. 4,195,644 it was found that an excessive amount of effort was required to close the safety door and relatch the pivotable lip portion thereof. In the herein illustrated safety door, separate manually operated mechanisms are provided for relatching the lip portion 51 and for reclosing the safety door 26. In reclosing the safety door 26, the door is first swung or pivoted from its tripped or open position shown in FIG. 6 by engaging the head 46 of shaft 29 with an appropriate wrench and then exerting manually generated torque to the shaft in the appropriate direction. This effort will swing the door 26 upwardly and rearwardly to the position shown in FIG. 5. The seal structures 131, 132, hereinafter described, serve as a stop to limit upward swinging (closing) movement of the door 26. The combine operator next fits an appropriate wrench on the head 91 of the rod 86 on the lip portion 51 and turns the head 91 in a counterclockwise direction, as shown in FIG. 5, until the concave camming surfaces 81, 82 of the detented element 71 are engaged by the camming surfaces 78, 79 on the heads or ends of the plungers 76, 77. It will be noted that the head 91 of the manually operated mechanism for restoring the lip portion 51 to its detented operating position is offset or spaced downwardly from the axis 53 of the lip portion. This offset condition avoids interference with structural members of the harvester and also avoids interference with a seal structure which will next be described.

In using prior art safety door constructions, grain loss occurred, in some combines, between the lateral ends of the safety door and the adjacent sidewalls of the inlet to the threshing chamber or cage. In order to reduce such loss, seal structures 131, 132 are provided between transversely opposite ends of the safety door 26 and the side walls 27, 28. The seal structures 131, 132 are substantially reverse images of one another and, therefore, only seal structure 131 will be described in detail. Referring particularly to FIGS. 4 and 6, the seal structure 131 includes a fore and aft extending part 136 having an inboard portion 137 in overlapping complementary relation to the upper surface 138 of the lateral end of the top plate 32 of the main body portion 31 of the door 26. The seal structure 131 also includes a fore and aft extending portion in the form of a flexible sealing part 139 which is substantially coextensive with the adjacent end of the safety door 26 and in sealing engagement with the sidewall 27. The sealing part 139 is secured to a vertical fore and aft extending flange 141 depending from the transversely extending part 136, to which it is welded, by a clip 142 held in place by a pair of rivets 143. The rear end 146 of the flange 141 extends beneath the front edge 66 of the concave 16 and the rear end 147 of the top part 136 extends rearwardly in overlapping relation to the edge 66. Thus, the ends 146, 147 form a motion transmitting connection between the concave 16 and the seal structure 131. The seal structure 131 is pivotally connected to the rod part 41 of the shaft 29 by a bushing 148 which is welded to part 141 of the seal structure 131. The bushing 148 pivotally engages rod part 41 for pivotal movement independently of door 26 but on the same axis 54. When the concave is vertically adjusted by eccentive mechanisms 23, 23', interconnected by the hex shaft 25, the seal structure and door 26 will move vertically with the edge 66 of concave 16. When the door 26 trips the seal structure 13' remains in place, as is illustrated in FIG. 6. When the door is relatched, the seal structure 131 serves as a stop or abutment limiting upward swinging movement of the door 26 as it swings to its closed position.

The safety door mechanism herein disclosed has an improved sealing relationship with the sidewalls of the crop inlet to the threshing chamber, is easier to relatch from a tripped position by virtue of two separate manually operated mechanisms for the lip portion and the door main body and the improved detent mechanism provides superior performance because of its adjustably positioned plunger assembly and adjustably biased plungers.

The embodiments of the invention in which an exclusive property or privilege is claimed are defined as follows:

1. A harvester having a threshing chamber, a crop inlet to the threshing chamber, a rotatable threshing rotor within the threshing chamber and a concave beneath the rotor having a predetermined threshing clearance with the latter, characterized by a safety door constituting a portion of a floor of the inlet to the threshing chamber forward of said concave, said safety door including a main body portion pivotally connected at its front end to the harvester on a first horizontal axis generally parallel to the axis of said threshing rotor and a lip portion pivotally connected to the rear of the main body portion for pivotal movement about a second horizontal axis generally parallel to said first horizontal axis between a detented operating position in which an edge of said lip is in overlapping engagement with the front end of said concave and a tripped position in which said lip is disengaged from said concave, a detent mechanism carried by said safety door for normally maintaining said lip portion rigid with respect to said body portion a manually operated control for said lip portion operable to pivot said lip portion from its tripped position to its detented operating position including a transversely extending part the end of which presents a wrench receiving head, and a manually operated control for said main body portion including a wrench receiving part nonrotatably secured to said main body portion in coaxial relation to said first horizontal axis.

2. The combination of claim 1 wherein said transversely extending part is spaced downwardly from said second horizontal axis.

* * * * *